US008949834B2

(12) United States Patent (10) Patent No.: US 8,949,834 B2
Olston (45) Date of Patent: Feb. 3, 2015

(54) MODELING AND SCHEDULING ASYNCHRONOUS INCREMENTAL WORKFLOWS

(75) Inventor: Christopher A. Olston, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 979 days.

(21) Appl. No.: 12/755,621

(22) Filed: Apr. 7, 2010

(65) Prior Publication Data

US 2011/0252427 A1 Oct. 13, 2011

(51) Int. Cl.
*G06F 9/46* (2006.01)
*G06F 17/30* (2006.01)

(52) U.S. Cl.
CPC ............................ *G06F 17/30864* (2013.01)
USPC ........................................ 718/102; 718/101

(58) Field of Classification Search
CPC ................................................ G06F 17/30864
USPC ........................................ 718/100, 101, 102
See application file for complete search history.

(56) References Cited

U.S. PATENT DOCUMENTS

| | | | | |
|---|---|---|---|---|
| 7,680,848 B2* | 3/2010 | Janedittakarn et al. | ....... | 707/613 |
| 2002/0174126 A1* | 11/2002 | Britton et al. | .................. | 707/100 |
| 2003/0185153 A1* | 10/2003 | Kohler et al. | ................. | 370/230 |
| 2004/0133457 A1* | 7/2004 | Sadiq et al. | ....................... | 705/7 |
| 2007/0112876 A1* | 5/2007 | Blaisdell et al. | .............. | 707/201 |
| 2011/0161391 A1* | 6/2011 | Araujo et al. | ................. | 709/201 |

OTHER PUBLICATIONS

Eder et al. "Temporal Modeling of Workflows with Conditional Execution Paths", Proceedings of the 11th International Conference on Database and Expert Systems Applications, 2000, pp. 243-253.*
Olston "Graceful Logic Evolution in Web Data Processing Workflows", Technical report, Feb. 2011, pp. 1-12.*
Olston Modeling and Scheduling Asynchronous Incremental Workflows. Technical report, Feb. 2011, pp. 1-13.*
Dionysios et al. "Stateful Bulk Processing for Incremental Algorithms", ACM Symposium on Cloud Computing (SOCC), Indianapolis, Indiana, Jun. 2010. pp. 1-12.*
Abadi, D.J., et al. "Aurora: A New Model and Architecture for Data Stream Management," *VLDB Journal*, 12(2), 2003. (20 Pages).
Arasu, A. et al. "The CQL Continuous Query Language: Semantic Foundations and Query Execution," *VLDB Journal*, 15(2):121-142, 2006. (32 Pages).

(Continued)

*Primary Examiner* — Emerson Puente
*Assistant Examiner* — Willy W Huaracha
(74) *Attorney, Agent, or Firm* — Weaver Austin Villeneuve & Sampson LLP

(57) ABSTRACT

Disclosed are methods and apparatus for scheduling an asynchronous workflow having a plurality of processing paths. In one embodiment, one or more predefined constraint metrics that constrain temporal asynchrony for one or more portions of the workflow may be received or provided. Input data is periodically received or intermediate or output data is generated for one or more of the processing paths of the workflow, via one or more operators, based on a scheduler process. One or more of the processing paths for generating the intermediate or output data are dynamically selected based on received input data or generated intermediate or output data and the one or more constraint metrics. The selected one or more processing paths of the workflow are then executed so that each selected processing path generates intermediate or output data for the workflow.

23 Claims, 10 Drawing Sheets

(56) References Cited

OTHER PUBLICATIONS

Banko, M. et al. "Open Information Extraction from the Web," *Proc. IJCAI*, 2007. (7 Pages).
Botzler, C. S. et al. "Finding Structures in Photometric Redshift Galaxy Surveys: An Extended Friends-of-Friends Algorithm," *Monthly Notices of the Royal Astronomical Society* 349:425-439, 2004. (158 Pages).
Broder, A. Z. et al. "Syntactic Clustering of the Web," *Proc. WWW*, 1997. (13 Pages).
Carney, D. et al. "Operator Scheduling in a Data Stream Manager," *Proc. VLDB*, 2003. (12 Pages).
Chien, S. et al. "Link Evolution: Analysis and Algorithms," *Internet Mathematics*, 1(3), 2003. (28 Pages).
Cho, J. et al. "The Evolution of the Web and Implications for an Incremental Crawler," *Proc. VLDB*, 2000. (21 Pages).
Cho, J. et al. "Effective Page Refresh Policies for Web Crawlers," *ACM Transactions on Database Systems*, 28(4), 2003. (36 Pages).
Cho, J. et al. "Efficient Crawling Through URL Ordering," *Proc. WWW*, 1998. (18 Pages).
Colby, L. S. et al. "Algorithms for Deferred View Maintenance," *Proc. ACM SIGMOD*, 1996. (12 Pages).
Desikan, P. et al. "Incremental Page Rank Computation on Evolving Graphs," *Proc. WWW*, 2005. (9 Pages).
Dijkstra, E. W. "A Note on Two Problems in Connexion with Graphs," *Numerische Mathematik*, 1:269-271, 1950. (3 Pages).
Gray, J. et al. "Data Cube: A Relational Aggregation Operator Generalizing Group-By, Cross-Tab, and Sub-Totals," *Data Mining and Knowledge Discovery*, 1(1), 1997. (25 Pages).
Gupta, A. et al. "Maintenance of Materialized Views: Problems, Techniques, and Applications," *Data Engineering Bulletin*, 18(2):5-20, 1995. (16 Pages).
Ivezic, Z. et al. "LSST: from Science Drivers to Reference Design and Anticipated Data Products," http://arxiv.org/abs/0805.2366 (34 Pages).
Joachims, T. et al. "Accurately Interpreting Clickthrough Data as Implicit Feedback," *Proc. SIGIR*, 2005. (8 Pages).
Lindsay, B. et al. "A Snapshot Differential Refresh Algorithm," *Proc. ACM SIGMOD*, 1986. (8 Pages).
Neophytou, P. et al. "Towards Continuous Workflow Enactment Systems," *International Conference on Collaborative Computing: Networking, Applications and Worksharing*, 2008. (17 Pages).
Nie, Z. et al. "Web Object Retrieval," *Proc. WWW*, 2007. (9 Pages).
Ozsoyoglu, G. et al. "Temporal and Real-Time Databases: A Survey," *IEEE Trans. Knowledge and Data Engineering*, 7(4)513-532, 1995. (20 Pages).
Quass, D. et al. "Making Views Self-Maintainable for Data Warehousing," *Proc. PDIS*, 1996. (12 Pages).
Salem, K. et al. "How to Roll a Join: Asynchronous Incremental View Maintenance," *Proc. ACM SIGMOD*, 2000. (12 Pages).
Tavares, T. et al. "An Efficient and Reliable Scientific Workflow System," *Proc. of 7th International Symposium on Cluster Computing and the Grid (CCGrid'07)*, 2007. (8 Pages).
York, D. et al. "The Sloan Digital Sky Survey: Technical Summary," *Astronomical Journal*, 120:1579-1587, 2000. (22 Pages).

* cited by examiner

150

| time | new crawl data | new click score data | click score snapshot |
|---|---|---|---|
| Monday 12am | | +(alligator.com, 18) | (alligator.com, 18) |
| Monday 8am | +(alligator.com/boots.html, d₁) | | |
| Tuesday 12am | | -(alligator.com, 18)<br>+(alligator.com, 21)<br>+(snake.com, 7) | (alligator.com, 21)<br>(snake.com, 7) |
| Tuesday 11am | +(alligator.com/hats.html, d₂) | | |
| Tuesday 5pm | +(snake.com/boots.html, d₃) | | |
| Wednesday 12am | | -(alligator.com, 21)<br>+(alligator.com, 22)<br>-(snake.com, 7)<br>+(snake.com, 14) | (alligator.com, 22)<br>(snake.com, 14) |
| Wednesday 2pm | +(alligator.com/purse.html, d₄)<br>+(snake.com/purse.html, d₅) | | |

| time | new join output data | accumulated join data |
|---|---|---|
| Monday 8am + ε | +(alligator.com/boots.html, d₁, 18) | *(any prior data...)*<br>(alligator.com/boots.html, d₁, 18) |
| Tuesday 11am + ε | -(alligator.com/boots.html, d₁, 18)<br>+(alligator.com/boots.html, d₁, 21)<br>+(alligator.com/hats.html, d₂, 21) | *(any prior data...)*<br>(alligator.com/boots.html, d₁, 21)<br>(alligator.com/hats.html, d₂, 21) |
| Tuesday 5pm + ε | +(snake.com/boots.html, d₃, 7) | *(any prior data...)*<br>(alligator.com/boots.html, d₁, 21)<br>(alligator.com/hats.html, d₂, 21)<br>(snake.com/boots.html, d₃, 7) |
| Wednesday 2pm + ε | -(alligator.com/boots.html, d₁, 21)<br>+(alligator.com/boots.html, d₁, 22)<br>-(alligator.com/hats.html, d₂, 21)<br>+(alligator.com/hats.html, d₂, 22)<br>-(snake.com/boots.html, d₃, 7)<br>+(snake.com/boots.html, d₃, 14)<br>+(alligator.com/purse.html, d₄, 22)<br>+(snake.com/purse.html, d₅, 14) | *(any prior data...)*<br>(alligator.com/boots.html, d₁, 22)<br>(alligator.com/hats.html, d₂, 22)<br>(snake.com/boots.html, d₃, 14)<br>(alligator.com/purse.html, d₄, 22)<br>(snake.com/purse.html, d₅, 14) |

| time | new join output data | accumulated join data |
|---|---|---|
| Monday 8am + ε | +(alligator.com/boots.html, $d_1$, 18) | *(any prior data...)*<br>(alligator.com/boots.html, $d_1$, 18) |
| Tuesday 11am + ε | −(alligator.com/hats.html, $d_2$, 21) | *(any prior data...)*<br>(alligator.com/boots.html, $d_1$, 18)<br>(alligator.com/hats.html, $d_2$, 21) |
| Tuesday 5pm + ε | +(snake.com/boots.html, $d_3$, 7) | *(any prior data...)*<br>(alligator.com/boots.html, $d_1$, 18)<br>(alligator.com/hats.html, $d_2$, 21)<br>(snake.com/boots.html, $d_3$, 7) |
| Wednesday 2pm + ε | +(alligator.com/purse.html, $d_4$, 22)<br>+(snake.com/purse.html, $d_5$, 14) | *(any prior data...)*<br>(alligator.com/boots.html, $d_1$, 18)<br>(alligator.com/hats.html, $d_2$, 21)<br>(snake.com/boots.html, $d_3$, 7)<br>(alligator.com/purse.html, $d_4$, 22)<br>(snake.com/purse.html, $d_5$, 14) |

| temporal provenance | $P^L$ | $P^R$ | consistent? |
|---|---|---|---|
| $P_1$ = ({Mon 8am}, {Mon 12am}) | Mon 8am | Tue 12am | yes |
| $P_2$ = ({Mon 8am}, {Tue 12am}) | Tue 12am | Tue 11am | yes |
| $P_3$ = ({Tue 11am}, {Mon 12am}) | Tue 11am | Tue 12am | no |
| $P_4$ = ({Wed 2pm}, {Mon 12am, Tue 12am, Wed 12am}) | Wed 2pm | Tue 12am | no |

Figure 1E

MODELING AND SCHEDULING ASYNCHRONOUS INCREMENTAL WORKFLOWS

BACKGROUND OF THE INVENTION

The present invention relates to data processing systems, and more specifically to scheduling large work flows on such systems.

Large Internet companies such as Yahoo!, Inc. continuously generate an enormous amount of data, including user data and web page data, from web searches to social relationships to geo-location data, and system data such as various performance metrics. Deriving useful information from the large volume of raw data supports a variety of service objectives, including presenting relevant contextual information, identifying trends in user behavior, and offering better targeted services.

Different types of data processing workflows may benefit from custom scheduling. Specifically, improved mechanisms for efficiently representing and scheduling diverse workflows for processing data would be beneficial.

SUMMARY OF THE INVENTION

Apparatus and methods for scheduling an asynchronous workflow having a plurality of processing paths are disclosed. In one embodiment, one or more predefined constraint metrics that constrain temporal asynchrony for one or more portions of the workflow may be received or provided. Input data is periodically received or intermediate or output data is generated for one or more of the processing paths of the workflow, via one or more operators, based on a scheduler process. One or more of the processing paths for generating the intermediate or output data are dynamically selected based on received input data or generated intermediate or output data and the one or more constraint metrics. The selected one or more processing paths of the workflow are then executed so that each selected processing path generates intermediate or output data for the workflow.

In a specific implementation, the input, intermediate, and output data includes both incremental and non-incremental data variants. In a further aspect, dynamically and periodically selecting one or more of the processing paths includes selecting between incremental and non-incremental data variants to achieve one or more of the constraint metrics and/or a processing cost metric. In another aspect, dynamically and periodically selecting one or more of the processing paths is performed after one or more portions of the workflow fail to meet one or more of the constraint metrics. In yet another aspect, the one or more processing paths include both synchronous and asynchronous operator variants, and the dynamically and periodically selecting one or more of the processing paths includes selecting between synchronous and asynchronous operator variants to achieve one or more of the constraint metrics.

In another embodiment, input data that is older than a predefined amount is pruned. In another aspect, dynamically and periodically selecting one or more of the processing paths comprises analyzing the processing paths and their operators in an order that is top to bottom. Operators that have a high cost are excluded from path analysis when there is another operator that will generate the same data at a lower cost. In a further aspect, dynamically and periodically selecting one or more of the processing paths is accomplished so that some abutting incremental data blocks are automatically combined.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 1B is a table showing example data input to the join algorithm of FIG. 1A.

FIG. 1C is a table showing example data output that is synchronously produced by the join algorithm of FIG. 1A from the input data of FIG. 1B.

FIG. 1D is a table showing example data output that is asynchronously produced by the join algorithm of FIG. 1A in accordance with one embodiment.

FIG. 1E shows the temporal provenance of some possible crawl-clickscore join snapshots and indications as to whether such temporal provenances are consistent.

DETAILED DESCRIPTION OF THE SPECIFIC EMBODIMENTS

Figure 1A:
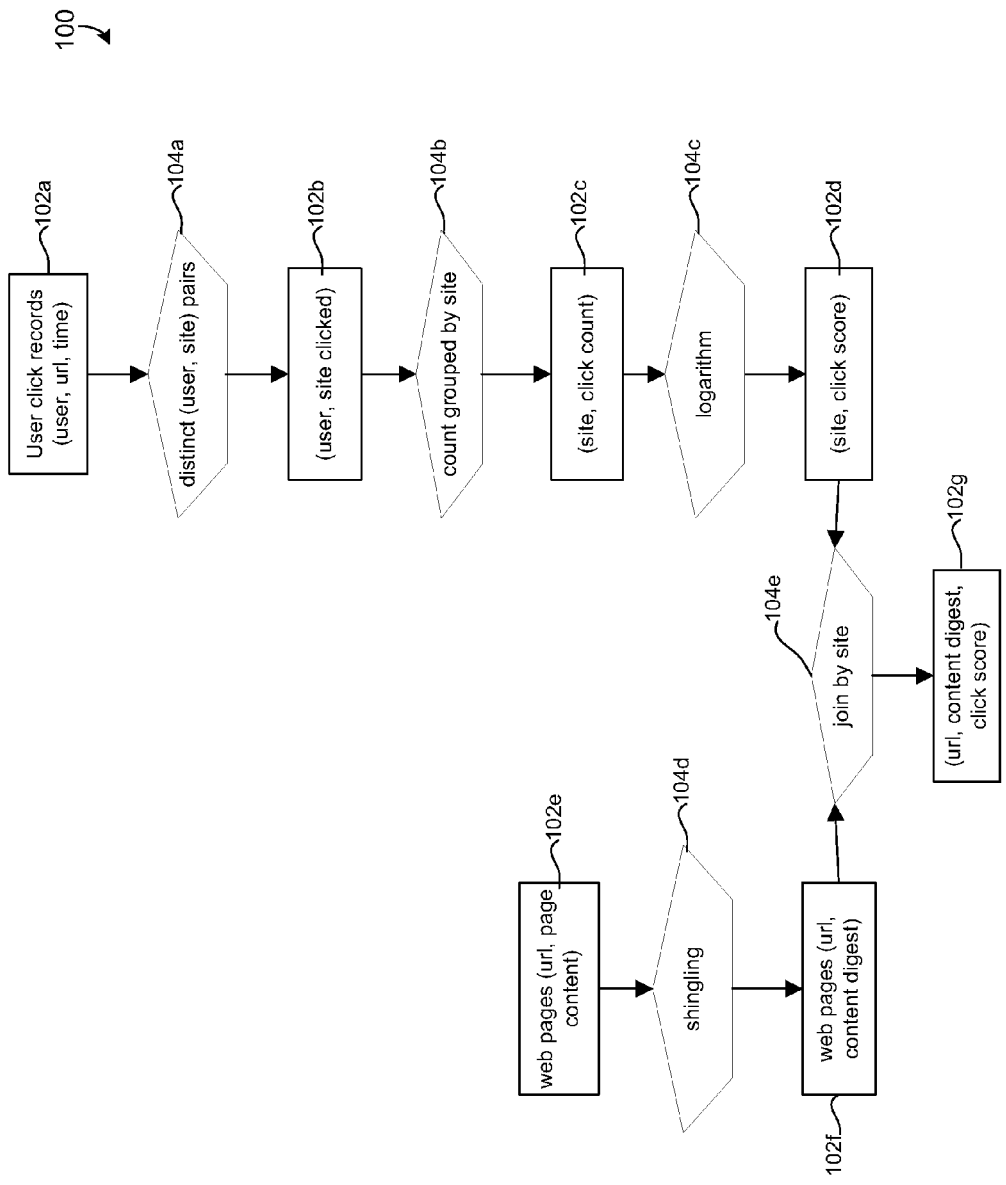
FIG. 1A is a diagrammatic representation of a simplified asynchronous workflow for web search preprocessing in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, organizations can deploy complex workflows to transform incoming raw data feeds (e.g. web crawls, telescope images) into refined, structured data products (e.g. web entity-attribute-relationship graphs, sky object databases). These workflows operate over vast quantities of data, which arrives in large waves and is processed incrementally in the manner of view-maintenance algorithms for data warehouses.

Some portions of a workflow can be trivially incremental ("stateless" processing steps like extracting noun phrases from newly-crawled pages), whereas other steps are not amenable to efficient incremental processing in the face of large input waves (e.g. computing PageRank scores, clustering sky objects are typically performed as periodic batch jobs. Operations can also fall in-between these two extremes. By way of examples, distributive/algebraic functions like counting links can reference and update a fairly large amount of state, and incremental maintenance of join views can require joining newly-arrived data on each input with historical data from the other input.

It may generally not be feasible to keep derived data sets fully synchronized with all newly-arriving input data, while still meeting the latency requirements of the application. Besides, the data entering the system can be merely a stale and/or noisy reflection of the real world (asynchronously-gathered web pages and click logs with spam and robots; old photons with atmospheric distortion), and many of the algorithms that rely on this data and its derivations can be explicitly tolerant of noise (especially machine learning algorithms and semantically loose environments like web search).

For example, a web search engine may need to expedite processing of newly-crawled web pages, even if that means labeling them with somewhat out-of-date site-level PageRank scores, and piping that temporally inconsistent joined data to further processing steps. In the astronomy domain, the latest observation of a sky object may be compared against prior observations and cluster-level statistics to aggregate unique temporal behaviors for follow-up observation, with the cluster statistics (and indeed the cluster model itself) updated periodically rather than continuously.

Even when there is no need to combine incoming data with out-of-date views, nonuniform latency may be required such that incoming data is processed in non-temporal order. For example, in the web domain one might process clicks that resulted in 404 (page not found) errors ahead of earlier, successful clicks, to expedite purging of "dead" content from various caches and indices. In astronomy, one might prioritize near-earth objects, which can have a short observation window and require immediate attention. Of course, out-of-order processing can impact the semantics of downstream operations, which are preferably taken into account.

The term "asynchronous" is used herein to refer to workflows that introduce temporal inconsistency or out-of-orderness into derived data products. Managing such workflows poses a major challenge. FIGS. 1A through 1D will be used to illustrate some challenges associated with asynchronous workflows. FIG. 1A is a diagrammatic representation of a simplified workflow for web search preprocessing in accordance with one embodiment of the present invention. In certain implementations, data blocks (input, intermediate, and output data blocks) can be represented as rectangles, while processing steps are represented as pentagons with arrows showing the data flow.

Referring to the right-hand pathway of FIG. 1A, process 104a analyzes user click records 102a to find distinct user/web-site pairs (e.g., site is a simple function of URL, applied on the fly and not shown in the Figure) to generate intermediate data 102b, and then process 104b determines the number of distinct users clicking on each site. A stateless "logarithm" function 104c then converts click counts 102c into simple "click scores", which can be used to gauge web site quality (in reality such scores incorporate other factors as well), and these scores are joined with a table of web page content digests 102f (extracted from page content 102e via a stateless "shingling" algorithm 104d) to associate a quality score with each page. The resulting data 102g can be a table of URLs with content digests and click scores, which may be passed to further analysis steps or loaded into an index (a.k.a. inverted file) for searching and ranking procedures.

Focusing on the final step (the join operation), example data input 150 to the join algorithm is shown in FIG. 1B. If the join process is invoked immediately after each batch of crawl data arrives, a synchronous, incremental join algorithm can produce, for example, the output 160 shown in FIG. 1C, which assigns click scores to newly crawled URLs and also updates the click scores of URLs crawled in the past.

In a web indexing scenario, getting newly-discovered URLs into the index quickly can be more important than keeping indexed click scores perfectly accurate. Hence, rather than a full incremental join of URLs with click scores, an approximate join can be performed that tags new URLs with a snapshot of the click score table (perhaps indexed by site). The click score snapshot can be updated only periodically (e.g. daily), and the updating can be performed without disrupting any ongoing approximate join with URLs (e.g. via two concurrent versions of the click score table). The asynchronous join output 170 for the input of FIG. 1B is shown in FIG. 1D. Unlike in the synchronous case (FIG. 1C), the asynchronous output 170 does not update the click scores of pages crawled in the past.

Unfortunately, the asynchronous join can lead to unbounded staleness in click scores (e.g., a URL crawled a long time ago would be associated with a very out-of-date click score). Although a certain degree of staleness can be acceptable in some application scenarios, unbounded staleness is not typically acceptable. It can then become beneficial to occasionally (e.g. weekly) re-scan URLs that have been processed in the past and join them with newer click scores, perhaps via a full batch join to produce a replacement output table.

When bringing the click scores up to date, enqueued click records can be processed through the chain of steps in the right-hand column of FIG. 1A using incremental or batch processing at each step. The incremental versus batch choice can depend on the amount of accumulated data, the data distributions, access methods used, and other factors affecting processing costs.

A related issue can be the choice of data encoding for each intermediate data set (e.g. full-table snapshots, insertions and deletions of full records, upserts, or (key, delta) representations like (site, click count increment)), which may need to change dynamically based on the processing strategies of downstream operations.

Overall, although the workflow is conceptually straight forward (FIG. 1A), a scheduler can be configured to rotate among several alternative data processing and representation options, while taking into account their efficiency, latency and consistency implications.

In general, certain embodiments of the present invention provide techniques and apparatus for generating and scheduling a workflow for asynchronously processing large amounts of data blocks (e.g., web pages) in both an incremental and bulk manner via one or more selectively scheduled process paths based on predefined data latency and consistency goals. For example, asynchronous behavior, in which temporal asynchrony is present, can first be explicitly programmed using certain techniques of the present invention. Data latency and consistency goals can also be predefined (e.g., by a user) for any one or more portions of the workflow. The scheduler can then be configured to dynamically select particular process paths from among a plurality of paths based on such goals as such paths fail or meet such goals over time. Certain scheduler implementations can dynamically switch between synchronous and asynchronous operator variants to achieve predefined temporal semantics, and also dynamically choose among incremental and non-incremental variants based on the amount of data to be processed and operator costs.

For example, in the above described web search preprocessing workflow, the portion of the workflow that tags newly-crawled pages with site-level ranking features and inserts them into the index can be executed continuously to ensure low crawl-to-index latency. However, new pages can also be folded into the site-level features occasionally, via an asynchronous workflow component. To avoid unbounded inconsistency between pages and aggregated page features, indexed pages can be periodically reprocessed and re-indexed, using yet another asynchronous component. Certain scheduler embodiments are configured to manage selective execution of these asynchronous components based on temporal criteria (e.g., such as a freshness or consistency metric), as well as data size and operator cost.

Some of the workflow and scheduler examples are described herein with reference to particular types of data (e.g., crawl data). However, embodiments of the present invention can be implemented with respect to any type of data. Additionally, workflows can be formed for any type of task or partial task. A workflow can include any number and type of operators and such operators may be arranged any suitable configuration and order.

A workflow model embodiment will now be described in more detail. In general, a workflow can be modeled as a directed acyclic graph having vertices that are data channels and operators. In the illustrated examples, the data channels are depicted as rectangles, individual operators as ovals, and pentagons represent a conglomeration of operators (explained further herein). A data channel can be defined as a pathway along which data flows between operators, from an external data source to an operator, or from an operator to an external data consumer. Data on a channel may be stored, pipelined, or perhaps not created at all, depending on the scheduling and execution parameters of the workflow (discussed later). Operators can be configured to connect to data channels, and data channels can be arranged to connect to operators (or external sources/consumers). Other types of connections can be prohibited in this model.

Data channels to which data is supplied by external sources are called input channels; other channels are called derived channels. Derived channels that have data read by external consumers are called output channels; other derived channels can also be referred to as intermediate channels. A workflow may have multiple paths between a pair of data channels, representing alternative data processing pathways, which present an opportunity for dynamic optimization by a scheduler.

Each data channel can be described as containing a representation of a time-varying relation R, e.g., a mapping from time to a relation snapshot according to a global clock. In particular, a relation snapshot can be represented as an interval of validity $[t_1; t_2)$, where $t_1$ and $t_2$ can be timestamps from the global clock.

An input relation being updated over time can be represented as a series of abutting intervals of validity: $[t_1; t_2)$; $[t_2; t_3)$; $[t_3; t_4)$; etc. Since the right endpoint of each interval is determined by the arrival time of the next update in this example embodiment, a relation snapshot can be identified by the left endpoint, e.g. $t_1$. For a given snapshot timestamp t, $t^R$ denotes the right end-point of its validity interval, (for example, $t^R$ for the first interval above=$t_2$). The right endpoint of the most recent snapshot's interval of validity has yet to be determined, and can be denoted by the special marker "now". In comparisons and computations, now can evaluate to the current clock time, which has the property that for any update timestamp t, t is less than now. Likewise, $t^L$ (e.g., $t_1$) denotes the left end-point of its validity interval.

A snapshot of an intermediate or output relation can be defined by its temporal provenance, e.g., the timestamps of the input relation snapshots from which it was derived. (For convenience, "temporal provenance" is sometimes shortened to "provenance," and a snapshot is referred to by its provenance metadata.) The temporal provenance of a snapshot of a relation on channel C can be denoted $P=(T_1; T_2; \ldots; T_n)$, where n is the number of paths from an input channel to C, and $T_i$ denotes the set of timestamps of input i snapshots that are reflected in the derived data.

The temporal provenance of the click score snapshot shown in the top-right cell for the input data 150 of FIG. 1B is P=({Monday 12 am}). For the synchronous join output snapshot in the bottom-right cell of for the output data 160 of FIG. 1C, provenance is P=({Wednesday 2 pm}; {Wednesday 12 am}). For the bottom-right cell of FIG. 1D (asynchronous join output), P=({Wednesday 2 pm}; {Monday 12 am, Tuesday 12 am, Wednesday 12 am}), because that snapshot reflects the latest crawl data combined with click score data drawn from three different snapshots (Monday 12 am, Tuesday 12 am and Wednesday 12 am), e.g., three different click score values for alligator.com are present (18, 21 and 22).

FIG. 1E shows the temporal provenance of some possible crawl-clickscore join snapshots, gives their $P^L$ (left end-point provenance) and $P^R$ (right end-point provenance) values, and states whether they are consistent. Intuitively speaking, a snapshot with provenance $P_3$ can be defined as inconsistent because such snapshot combines crawl data from validity interval [Tuesday 11 am, Tuesday 5 pm) with click score data from a disjoint validity interval [Monday 12 am, Tuesday 12 am). A snapshot with provenance $P_4$ can be defined as inconsistent because it combines click score data from three disjoint validity intervals: [Monday 12 am, Tuesday 12 am), [Tuesday 12 am, Wednesday 12 am) and [Wednesday 12 am, now). Certain embodiments of the present invention allow consistency goals with respect to asynchronous workflows to be taken into account when scheduling such workflows as discussed further herein.

Various examples of different workflows and different data formats will now be described. In a workflow, data channels are generally connected by operators, which process data. Upon being invoked, an operator consumes zero or more data blocks from each of its inputs, and emits zero or more data blocks to each of its outputs. Each operator can have an associated input signature, which constrains the data types and consistency properties of blocks that is to be consumed by such operator. An operator's output signature can specify the output block types so as to predefine temporal provenance or freshness metric (as described below) to output blocks.

In a specific implementation, data can accumulate on a particular data channel over time. Data blocks may vary widely in size, from a few bytes to hundreds of terabytes or more. In one description, a data block in this model is not a unit of physical storage, i.e. a data block is not the same as a disk block or disk page. Rather, a data block's size corresponds to a batch of data that has been generated at the same time (either by an external data source or by an upstream workflow operator).

Data may be described as being divided into three general varieties: base (non-incremental), strong delta (incremental), and weak delta. A base data block typically includes the full data records. In a specific embodiment, a base data block B can be said to include tuples having the full content of the relation with temporal provenance P. In contrast, a delta data block Δ merely includes changed (e.g., additional or deleted) records with respect to particular time frames. A strong delta data block can be defined as a set of records to be added, and a set of records to be deleted, to convert a base $B(P_1)$ to a later base $B(P_2)$. A delta block can be described relative to a particular base $B(P_1)$. A strong delta that contains no deletions is called monotone. A weak delta data block δ can be defined as any piece of data such that one can generate $B(P_2)$ from $B(P_1)$ and the weak delta data block δ.

Lossless compression can be permitted for any type of block. For example with strong deltas an in-place record update can be semantically represented as a deletion/insertion pair, but may be physically encoded such that unchanged fields are only stored once. Weak deltas can permit much more compact representations, but can limit opportunities for downstream operators to deal solely with the delta representation (without reading bases). Whereas the base and strong delta representations can be built into the system, weak delta representations can be added as custom extensions.

A simple example of a weak delta representation is upserts: a set of (key, new value) pairs such that if an old record with a given key is present in the base, the new value supersedes the old value. Upserts are quite common in practice, e.g. (URL, current page content) pairs emitted by a web crawler such that a new snapshot of a page replaces any prior snapshot. Another common weak delta representation can arise in the presence of incremental aggregation operators, which may emit (key, increment) pairs, e.g. {(cnn.com, +5), (yahoo.com, −2)} applied to a base {(cnn.com, 28), (yahoo.com, 43), (harvard.edu, 36)}.

A workflow may also be configured to include one or more widgets. In the illustrated examples, each widget is represented by a pentagon shape, such as the join widget 104e of FIG. 1A. In general, a widget can be defined as a sub-workflow that encapsulates multiple variants of a given operation (e.g. join). A widget can be in the form of a library element that a programmer can select and insert into a new or modified workflow. The purpose of a widget can be to permit automated, and even dynamic, selection of the operation variants based on various factors, such as the user's scheduling preferences, operator costs and data sizes as further described herein. Even operations that have only one variant may be complex (e.g., involve multiple primitive operations and/or intermediate states), and therefore be encapsulated into a single abstraction. Widgets may contain operators, other widgets (although recursion can be prohibited), and internal data channels, as the following examples illustrate.

Figure 2:
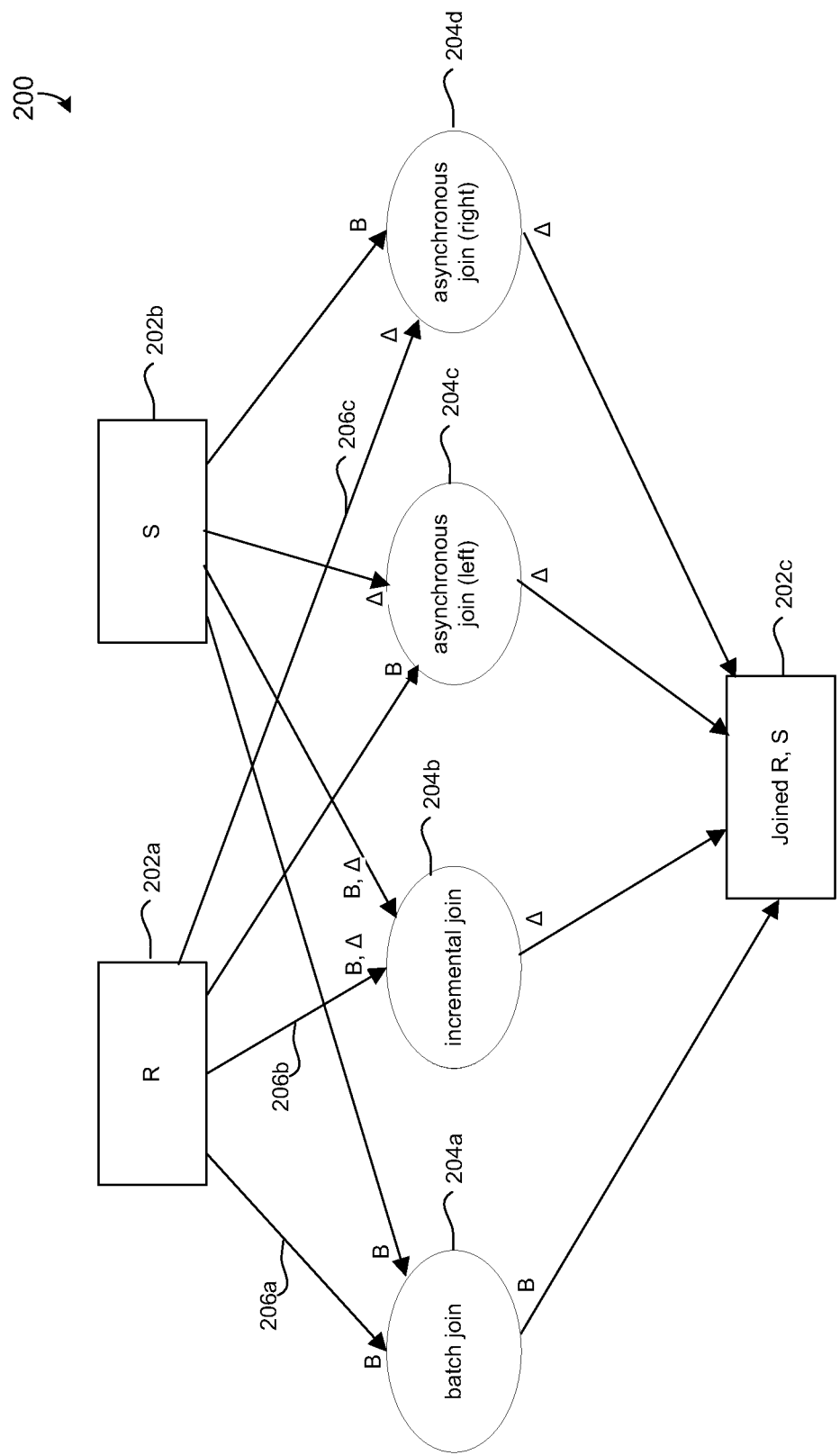
FIG. 2 is a diagrammatic representation of join widget in accordance with one embodiment of the present invention.

FIG. 2 is a diagrammatic representation of join widget 200 (such as the join widget of FIG. 1A) in accordance with one embodiment of the present invention. As shown, the join widget 200 can include any number and type of join operators, such as batch join 204a, incremental join 204b, asynchronous join (left) 204c, and asynchronous join (right) 204d. These different join operators join different combinations of different types of data blocks from two different input channels R (202a) and S (202b).

This example non-incremental (or batch) join operator 204a can reads mutually consistent base blocks from a pair of input channels R (202a) and S (202b), and can write a base block containing the result of this join into a third channel "Joined R and S" (202c). The input signature for this join 204a can be restricted to base type data blocks from both input channels R and S with a consistency constraint between these two input channels. The output signature can specify this consistency constraint.

Incremental join operator 204b can have input signatures for base data for one of the channels, e.g., R, from a first provenance ($P_1$) and delta data from a second later provenance ($P_2$). Likewise, this incremental join operator can have input signatures for the other channel, e.g., S, from a first provenance ($P_3$) and delta data from a second later provenance ($P_4$). Consistency constraints may be specified in an output signature for P1 and P3, as well as P2 and P4. If invoked on the example data in FIG. 1B following every injection of crawled data, this operator 204b can produce the output data shown in the second column of FIG. 1C.

An asynchronous join operator 204c can generally combine delta blocks from a first input (e.g. the latest crawled pages) with base blocks from another input (e.g. a click score relation snapshot). If invoked on the example data in FIG. 1B following every injection of crawled data, an asynchronous join can produce the output data blocks in the second column of FIG. 1D. Assuming the crawl data arrival prior to Monday 8 am occurred at Sunday 3 pm, the temporal provenance of these blocks can be specified as:

(Sun 3 pm, Mon 12 am) & (Mon 8 am, Mon 12 am)
(Mon 8 am, Tues 12 am) & (Tue 11 am, Tue 12 am)
(Tue 11 am, Tues 12 am) & (Tue 5 pm, Tue 12 am)
(Tue 5 pm, Wed 12 am) & (Wed 2 pm, Wed 12 am)

Figure 3:
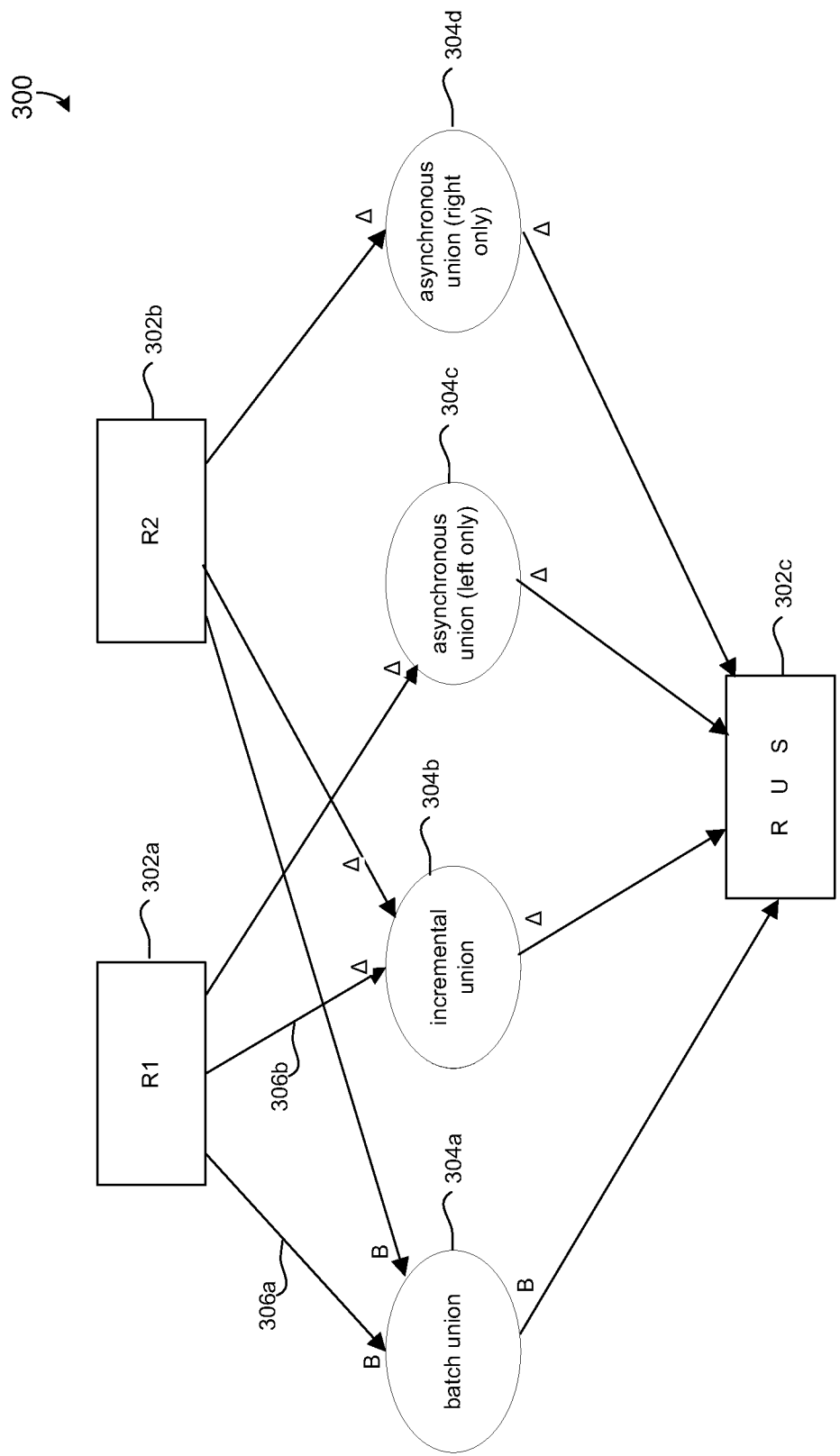
FIG. 3 is a diagrammatic representation of a bag union widget in accordance with one embodiment of the present invention.

Turning now to another type of widget, FIG. 3 is a diagrammatic representation of a bag union widget 300 in accordance with one embodiment of the present invention. As shown, the bag union widget 300 may include a synchronous batch union operator 304a to unify batch data from input channels R1 (302a) and R2 (302b), a synchronous incremental union operator 304b to unify incremental data from input channels R1 and R2, an asynchronous union operator 304c to propagate incremental data solely from the left input channel R1, and an asynchronous union operator 304d to propagate incremental data solely from the right input channel R2. These operators each generate base or incremental output channel "R U S" 302c.

Figure 4:
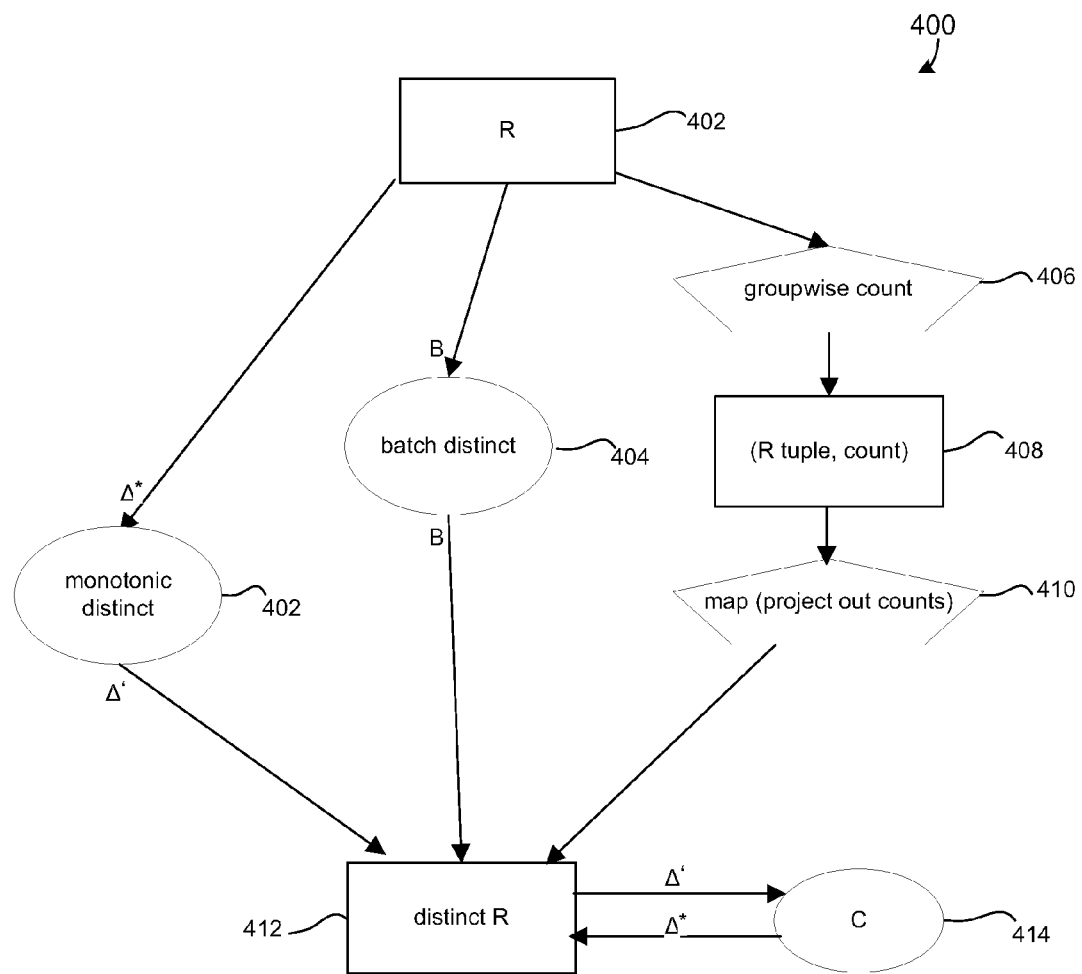
FIG. 4 is a diagrammatic representation of a distinct widget in accordance with a specific implementation of the present invention.

FIG. 4 is a diagrammatic representation of a distinct widget 400 in accordance with a specific implementation of the present invention. The right-hand pathway (406, 408, and 410) can maintain a count of each distinct input tuple R (402), and project out the count column to form the distinct output R (412). The middle pathway (404) can perform a batch distinct operation. The left-hand pathway (402) can be configured to apply only in the case of monotone input deltas, and emit weak deltas representing tuples to be inserted only if not already present. Actual duplicate detection work can be performed by a converter 414, which converts between different types of data.

Complex workflows may be used to transform incoming raw data feeds (e.g. web crawls, telescope images) into refined, structured data products (e.g. web entity-attribute-relationship graphs, sky object databases). These workflows can operate over vast quantities of data, which arrives in large waves. The data can be processed in a batch or incrementally. In general, certain embodiments of the present invention provide custom scheduling of workflows based on specified time dependency factors and latency requirements for various aspects of such workflows.

Figure 5:
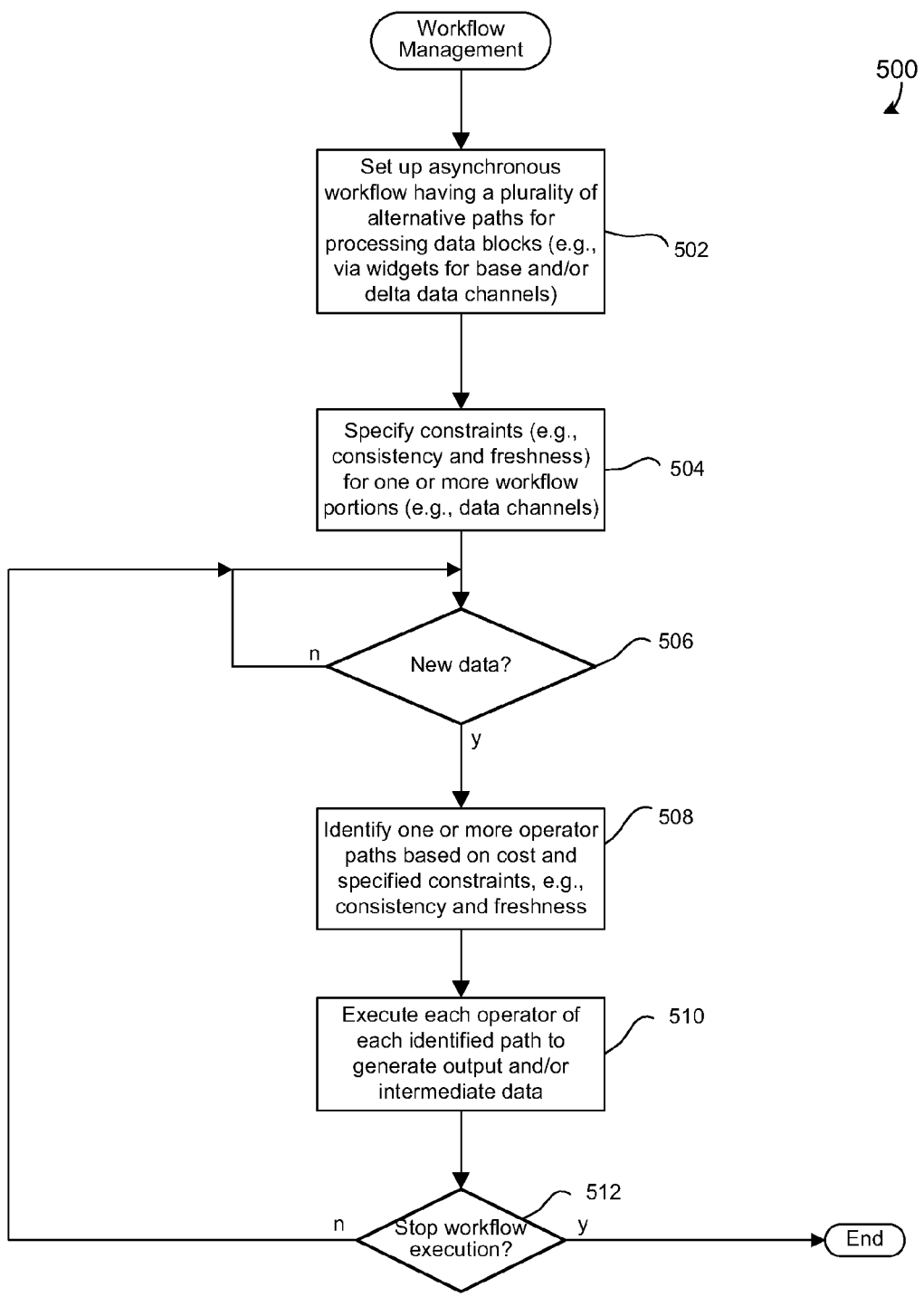
FIG. 5 is a flow chart illustrating a workflow management procedure in accordance with one embodiment of the present invention.

FIG. 5 is a flow chart illustrating a workflow management procedure 500 in accordance with one embodiment of the present invention. Initially, an asynchronous workflow having a plurality of alternative paths for processing data can be set up (or provided) in operation 502. For example, a programmer may use any combination of widgets and operators, which are coupled together by arrows into an, at least partly, asynchronous workflow, such as the workflow of FIG. 1A. Alternatively, a programmer may build alternatively pathways completely out of operators, rather than using widgets.

One or more temporal constraints (e.g., consistency and freshness) for one or more workflow portions (e.g., data channels) may be specified in operation 504. Constraints may be specified (e.g., by a programmer or user) for any number of data channels and paths. For example, a list of constraints, data channels, and paths for a particular workflow may be provided by a user to the scheduler. Each path and data channel does not have to be associated with a constraint. Constraints may correspond to scheduling directives, such as predefined inconsistency and staleness limits. A predefined processing cost (or a model for generating cost based on data size) may also be associated with each operator or set of operator.

In general, a scheduling directive can reference a particular derived data channel C (or set of channels or one or more processing paths), and impose constraints on the temporal provenance associated with C's block targets: $P=(T_1; T_2; \colon \colon \colon ; T_n)$, where n equals the number of pathways from some input channel to C. In one implementation, there are two types of directives, one that bounds the delay with which data passes through a particular workflow pathway, and one that controls inconsistency across pathways.

A freshness (staleness or latency) directive can take the form of "bound staleness (C; i; t)." Based on a specific staleness bound value (t) for a particular data channel (C) and path (i), the scheduler can then maintain the invariant $T^R_i + t \geq now$, for some constant $t \geq 0$. This freshness directive can specify bounds for the degree to which provenance element Ti lags behind the latest input data on the ith workflow pathway leading to C. An inconsistency bound may restrict the time lag between output data and the input data that was combined to get such output data for a particular set of one or more paths.

Figure 6:
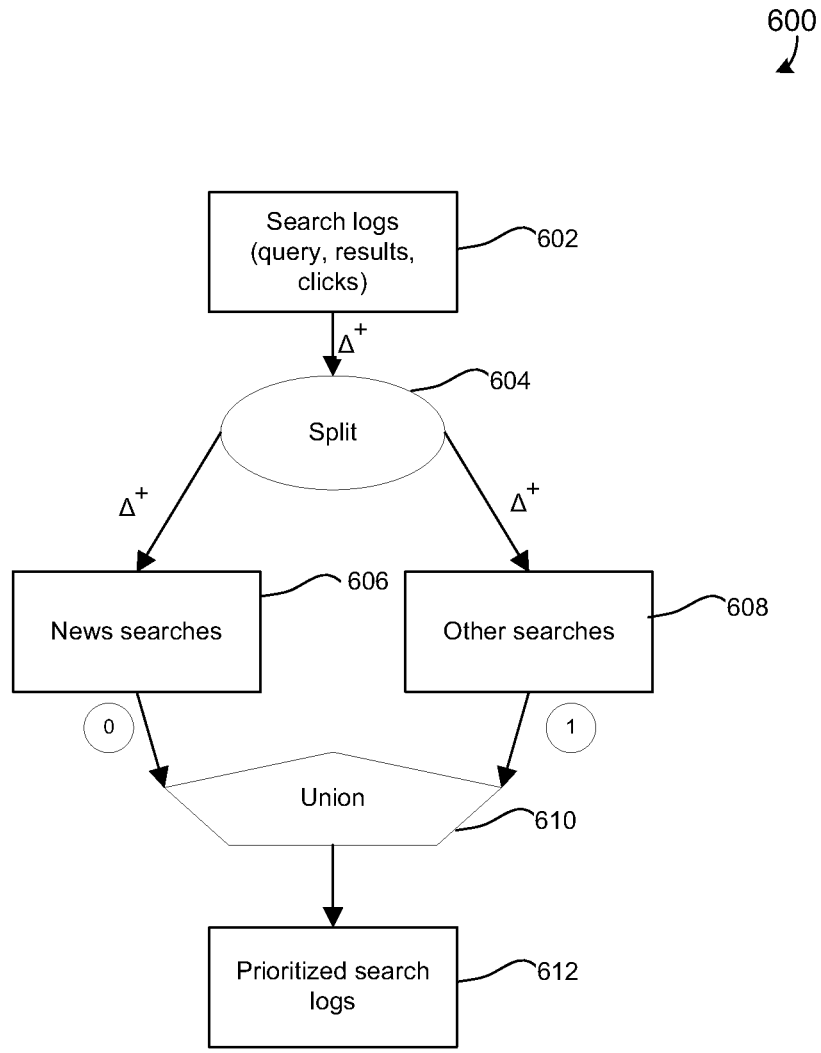
FIG. 6 is a workflow for prioritizing news relevance feedback in accordance with a specific implementation.

The workflow 600 of FIG. 6 for prioritizing news relevance feedback will be used to illustrate example freshness directives. The input 602 is a log of user search interactions, each containing a search query (e.g. "paris transit strike"), a list of links presented to the user in response to the query, and an indication of which of the links (if any) the user clicked on. A "split" operator 604 divides log records into ones that contain news links (606) among the search results, and ones that do not contain news links (608). The split operator 604 is followed by a union widget 610.

This workflow 600 may at first impression seem rather pointless, until one considers that the temporal provenance of the output 612 can contain two entries: one for the news branch (path 0) and one for the non-news branch (path 1). Hence, one may request preferential processing of the news branch (path 0) over the non-news branch (path 1). For example, the scheduling directives for this feedback prioritization workflow 600 might be:

bound staleness(output; 0; 0)
bound staleness(output; 1; 1 day)

The staleness of the output 612 relative to the news search data 606 from path 0 is set to "0" so that news searches are processed as soon as possible so that the output 612 does not become stale or lag behind the intermediate news search data 606. On the other hand, the output 612 can lag 1 day behind the intermediate data for other searches 608 from path 1. As a result, the news search data 612 is prioritized over other searches.

Another directive can be the consistency directive, which may take the form of "bound inconsistency(C; t)." Based on a specific inconsistency bound value (t) for a particular data channel (C), the scheduler can then maintain the invariant $P^L < P^R + t$, for some constant $t \geq 0$. If $t=0$, this invariant can enforce strict consistency. If $t>0$, a bounded amount of inconsistency can be permitted. For the workflow of FIG. 1A, the following example consistency directive may be specified to restrict the input data (102a and 102e) for generating output 102g to be no more than 1 week apart:

bound inconsistency(output; 1 week)

Consistency directives can be used to restrict the data blocks that can be fed to downstream operators or external consumers, e.g., data blocks that violate one or more consistency directives are not made available for reading (and ideally are not generated in the first place). Freshness directives can also be used to restrict which data blocks may be passed to downstream operators or consumers, but can be enforced on a "best-effort" basis. For instance, the scheduler does not construct execution plans that violate freshness directives, but these directives may nonetheless become violated due to arrival of new data during plan execution (which cannot be helped in some cases). In general, the same or different data may travel different paths at different times. For example, the scheduler dynamically routes data through different paths (or operators).

Referring back to FIG. 5, it may then be determined whether new data is present in operation 506. For instance, a scheduler may be invoked for each new set of data (e.g., input, intermediate, or output) or for a predefined amount of data or period of time. If there is no new data, the process may wait. When there is new data, one or more operator paths may then be identified based on cost and the specified constraints (e.g., consistency and freshness) in operation 508. Each operator of each identified path may then be executed to generate output and/or intermediate data in operation 510.

It may also be determined whether to stop workflow execution in operation 512. For example, a user interrupt may be triggered. The workflow then ends. Alternatively, if a stop is not specified, the process may continue to wait for new data in operation 506.

Figure 7:
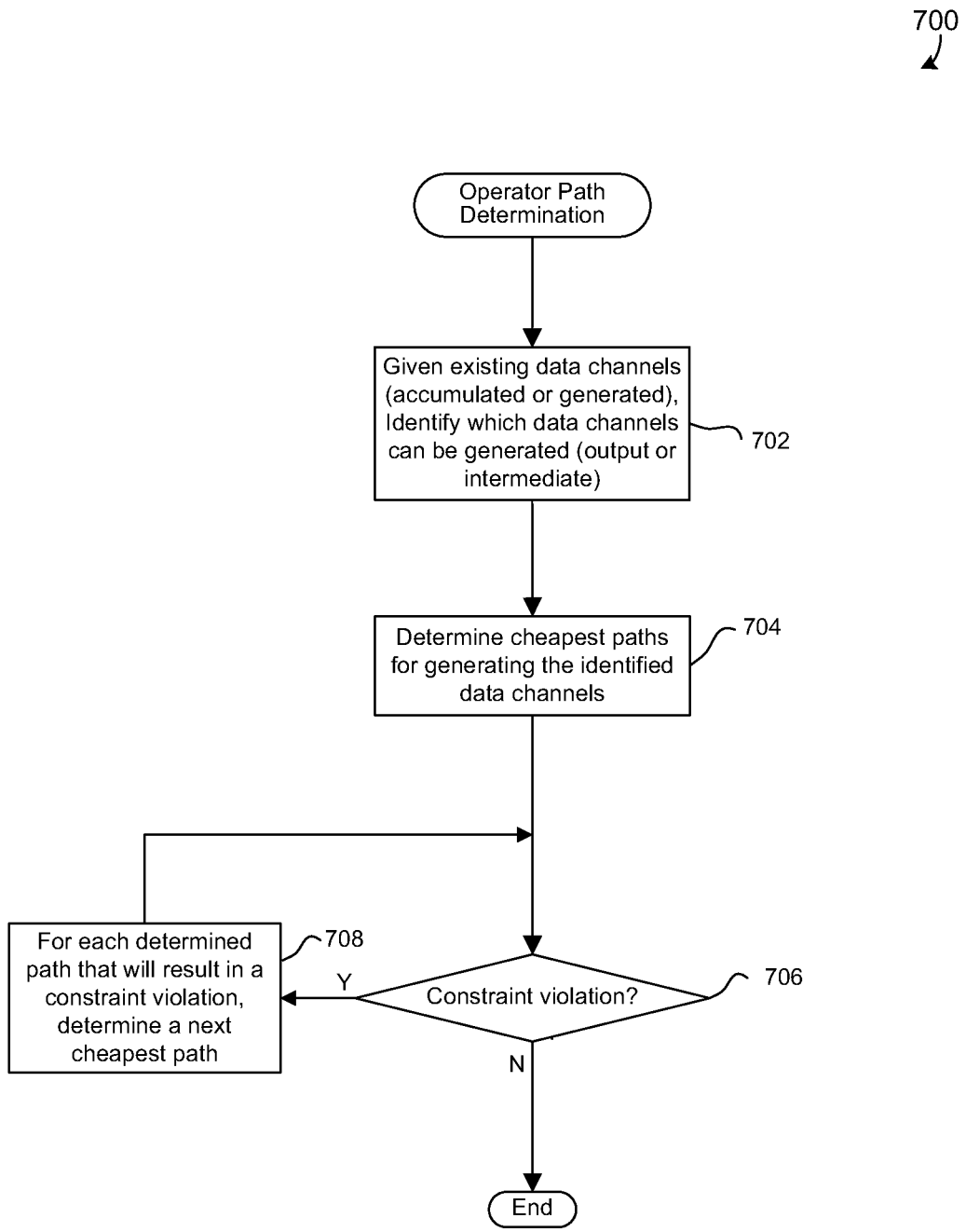
FIG. 7 is a flow chart illustrating an operator path determination procedure in accordance with a specific embodiment of the present invention.

Once a workflow is constructed, and freshness and/or consistency directives are specified for such workflow, scheduling such workflow based on freshness and consistency directives may be implemented in any suitable manner. For instance, the scheduler may utilize a variant of an algorithm for finding shortest paths (such as Dijkstra's algorithm). FIG. 7 is a flow chart illustrating an operator path determination procedure 700 in accordance with a specific embodiment of the present invention. Initially, it may be determined which data channels can be generated, given existing data channels, in operation 702. Existing data channels may correspond to either input data that has accumulated or newly arrived as input to a particular operator or widget or intermediate data that has been newly generated by one or more operators. It may be determined that each operator that has new data input can generate new output or intermediate data. Additionally, it may be determined that such new hypothetical data will also feed into other operators to produce other hypothetical data.

In the example workflow of FIG. 1A, if new user click records have been received on input data channel 102a, intermediate data channels 102b, 102c, and 102d and output data channel 102g may be identified as possibly generated from such input records 102a and the operators of widgets 104a, 104b, 104c, and 104e. It is noted that the scheduler does not have to see widget boundaries, but simply be configured to analyze lower level operators and operator paths (e.g., within the widgets).

One or more cheapest paths for generating the identified data channels may then be identified in operation 704. It may then be determined if any of the cheapest paths result in a constraint violation (e.g., violate an inconsistency or staleness bound) in operation 706. If a constraint is not violated, the path determination procedure ends (and such determined path is executed). If there is a constraint violation, a next cheapest path may be determined for each path that has been determined to result in a constraint violation in operation 708. More expensive paths continue to be determined until there are no constraint violations or such violations are minimized.

Cost for each operator or set of operators may be provided in any suitable manner. For instance, although inefficient, a cost metric for each data size can be associated with each operator or operator set. In a preferred embodiment, a cost model for generating cost values may be specified for each operator. A cost model may depend on various data characteristics, such as data size. For instance, cost may depend on total computation cost for processing data over the lifetime of the workflow and the scheduling overhead cost. Thus, data of a particular size that is input into a particular operator will result in a particular cost for such particular operator to produce output or intermediate data. Existing data may be determined to have zero cost. Cost for each operator to produce a new data channel may be scaled from $1 to $1 million, by way of example. Thus, the scheduler may select a particular data block and its operator and then query the cost model of the operator to determine cost for generating output or intermediate data based on the input data. The scheduler may then determine whether the constraints for such output or intermediate data (and input data) are met. If the constraints are not met, alternative paths may be analyzed for such output or intermediate data until constraints are met.

In another example, the scheduler may be implemented using the following pseudo-code:

```
Inputs:
    workflow W,
    existing data blocks B,
    scheduling directives D
initialize priority queue Q over (block; plan; cost) triples, which presents
    the lowest-cost entry first
for all b∈ B do
    insert (b, Ø, 0) into Q
end for
initialize Boptimized ←Ø;
while Q not empty do
    (b, p, c) ← Q.poll( )
    G ← blockGen(b, B, Boptimized, W, D)
    for all (b', p', c') ∈ G do
        if Q contains a triple (b', p'', c'') then
            if c' < c'' then
                Q.remove((b', p'', c''))
                Q.insert((b', p', c'))
            end if
        else
            Q.insert((b', p', c'))
        end if
```

```
    end for
        Boptimized.add((b, p, c))
end while
return selectOutputBlocks(Boptimized;W;D).plan
```

For operators with more than one input, whenever the algorithm selects one input to populate, it can try all combinations of input blocks on the other inputs, drawn from the set of already-optimized blocks. The blockGen subroutine enumerates all blocks that can be generated by applying an operator with b as one of its inputs, with other inputs (if any) drawn from B∪Boptimized, without violating any scheduling directives in D. This subroutine returns a set of (block, plan, cost) triples, where "plan" encodes the execution plan to create this block from existing blocks in B and "cost" is the total cost of this plan. The selectOutputBlocks subroutine selects a block from Boptimized to produce on each output channel such that all scheduling directives in D are satisfied.

In one embodiment, every possible data block and operator may be analyzed and enumerated to determine cheapest cost paths. However, these techniques may search over a prohibitively large space of (actual and potential) data blocks. Alternatively, various heuristics may be applied to reduce scheduler processing time. For instance, older blocks that are no longer useful may be pruned. If multiple operators produce the same data (e.g., same time), the scheduler may throw out the most expensive operator from further path determination. For instance, the scheduler may analyze paths and their operators in an order that is top to bottom (input to output) and throw out initial expensive operators from consideration when there is another operator that produces the same data at a lower cost. In another heuristic example, the order of blocks to generate a particular hypothetical data channel can start at the cheapest block (e.g., starts with $1 block, instead of $10 block). Thus, certain pathways (e.g., the most expensive) can be eliminated early.

As data arrives, long chains of successive delta blocks can accumulate on input and/or intermediate channels, which unnecessarily increase the search space for scheduling. A sequence of abutting delta blocks can be automatically combined, or chained, a) into a single block for the purpose of scheduling. However, a chain that spans an intermediate temporal provenance entry Pi may not be chained if either of the following conditions hold: (1) the channel contains a non-pruned base block B(Pi); (2) the channel's frontier set contains Pi. In either of these cases, chaining could eliminate important processing pathways and perhaps even permanently block processing on the workflow.

Blocks that are unlikely to lead to blocks that satisfy the downstream scheduling directives can also be eliminated from consideration by propagating scheduling directives upstream from the output channels toward the input channels, in a recursive fashion. When propagating directives from channel C to a channel C' that feeds C, C's staleness bounds (if any) may be projected to retain only the provenance elements that derive from C', and C's inconsistency bound (if any) can simply be copied. If C' has its own staleness and/or inconsistency bounds, these bounds can be combined with the ones propagated from C by taking the minimum T value of each corresponding pair. Lastly, all propagated staleness bounds can be constrained on channel C to be less than or equal to C's propagated inconsistency bound.

If the scheduler enumerates a potential block b on channel C, and C already contains an actual block b' such that (1) b and b' are of the same type (e.g. both strong deltas), (2) the target temporal provenance of block b' is temporally earlier than the target temporal provenance of block b, and (3) b' satisfies C's propagated scheduling directives, then b can be defined as an overkill block and pruned. Overkill blocks represent unnecessary processing work, and plans that incorporate them will ultimately not be chosen by the scheduler due to excessive cost.

Long-term cost may also be considered. As mentioned above, one implementation of a scheduling algorithm is reactive, in the sense that it waits for a directive to be violated and focuses on minimizing short-term costs. In the above example for FIG. 1A for the web search preprocessing workflow, an inconsistency bound of one week was specified on the output channel. After the initial week has elapsed, the reactive scheduling algorithm updates the "clickscore" data $102d$ to be just under one week old and recomputes the output data. This approach satisfies the immediate scheduling directives at minimal cost, but leads to updating the "clickscore" data in every iteration. A better long-term strategy is to bring the "clickscore" data fully up to date so that it can remain idle for a week. Thus, in one embodiment, potential block b can be ignored if another potential block b' of the same type has been enumerated (and not pruned) for the same channel, such that the target provenance for b is about the same as the target provenance for b'. (Note that this provision may not eliminate cost-based competition among different execution strategies; there is still competition among blocks with equal or incomparable target provenance.)

Figure 8:
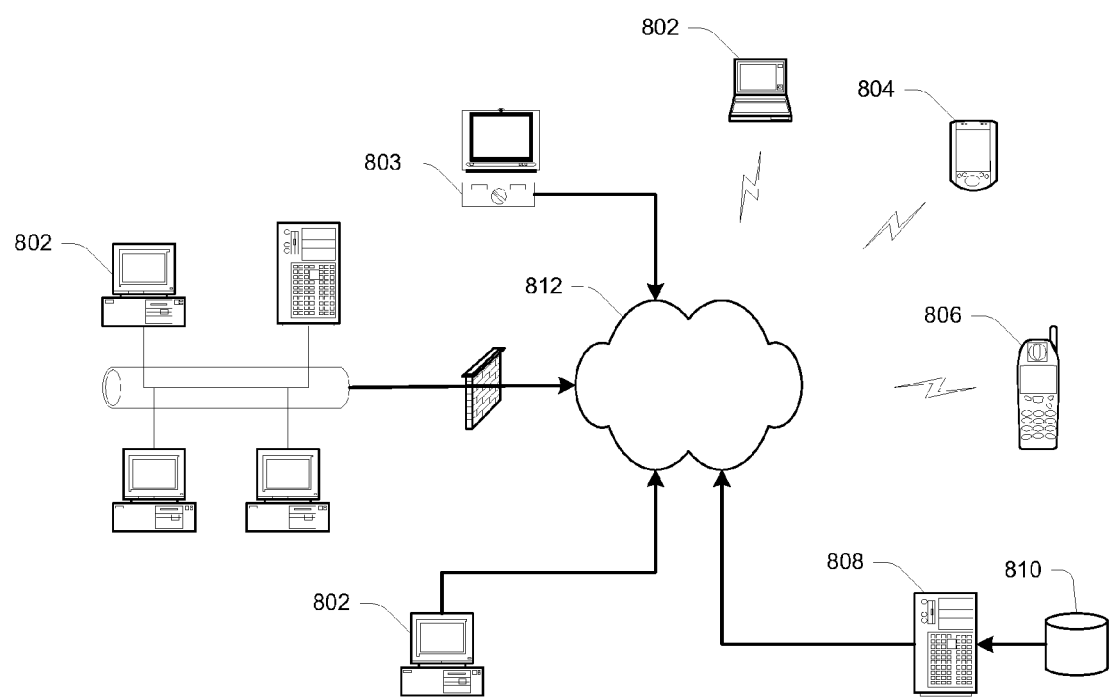
FIG. 8 is a simplified diagram of a network environment in which specific embodiments of the present invention may be implemented.

Embodiments for generating and modeling workflows or scheduling such workflows may be employed in a wide variety of diverse computing contexts. For example, as illustrated in FIG. 8, implementations are contemplated in which the relevant population of users interact with a diverse network environment via any type of computer (e.g., desktop, laptop, tablet, etc.) 802, media computing platforms 803 (e.g., cable and satellite set top boxes and digital video recorders), handheld computing devices (e.g., PDAs) 804, cell phones (camera phones with GPS) 806, or any other type of computing or communication platform.

And according to various embodiments, data that are processed in accordance with the invention may be obtained using a wide variety of techniques. For example, a user's interaction with a local application, web site or web-based application or service may be accomplished using any of a variety of well known mechanisms for managing data. However, it should be understood that such methods of obtaining data are merely exemplary and that data may be collected in many other ways.

Workflow generation and scheduling may be handled according to the invention in some centralized manner. This is represented in FIG. 8 by server 808 and data store 810 that, as will be understood, may correspond to multiple distributed devices and data stores. Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Systems for workflow generation and scheduling may be implemented on one or more computer systems. For instance, a computer system may include any number of processors (also referred to as central processing units, or CPUs) that are coupled to storage devices including primary storage (typically a random access memory, or RAM), primary storage (typically a read only memory, or ROM). The CPU may be of various types including microcontrollers and microprocessors such as programmable devices (e.g., CPLDs and FPGAs) and unprogrammable devices such as gate array ASICs or general-purpose microprocessors. As is well known in the art, primary storage can act to transfer data and instructions unidirectionally to the CPU and primary storage can be used typically to transfer data and instructions in a bi-directional manner. Both of these primary storage devices may include any suitable computer-readable media such as those described herein. A mass storage device may be also coupled bi-directionally to a CPU and provides additional data storage capacity and may include any of the computer-readable media described herein. A mass storage device may be used to store programs, data and the like and is typically a secondary storage medium such as a hard disk. It will be appreciated that the information retained within a mass storage device, may, in appropriate cases, be incorporated in standard fashion as part of primary storage as virtual memory. A specific mass storage device such as a CD-ROM may also pass data uni-directionally to the CPU.

Each CPU can also be coupled to an interface that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, each CPU optionally may be coupled to an external device such as a database or a computer or telecommunications network using an external connection. With such an external connection, it is contemplated that a CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store operator and widget libraries, workflow models, input, intermediary and output data, scheduler algorithms, cost parameters, staleness and inconsistency constraints, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of scheduling an asynchronous workflow having a plurality of processing paths, comprising:
   obtaining one or more temporal constraints that constrain one or more portions of the workflow;
   periodically obtaining input data and periodically generating, via one or more operators in the processing paths, intermediate or output data, wherein the input data, intermediate data, and output data together include both incremental and non-incremental data variants;
   dynamically and periodically selecting one or more of the processing paths for generating the intermediate or output data based on received input data or a first subset of the generated intermediate or output data and the one or more temporal constraints; and
   executing the selected one or more processing paths of the workflow so that each selected processing path generates a second subset of the intermediate or output data for the workflow.

2. The computer implemented method as recited in claim 1, wherein dynamically and periodically selecting one or more of the processing paths includes selecting between incremental and non-incremental data variants according to one or more of the temporal constraints and/or a processing cost metric.

3. The computer implemented method as recited in claim 1, wherein dynamically and periodically selecting one or more of the processing paths is performed after one or more portions of the workflow fail to satisfy one or more of the temporal constraints.

4. The computer implemented method as recited in claim 1, wherein the one or more processing paths include both synchronous and asynchronous operator variants and wherein dynamically and periodically selecting one or more of the processing paths includes selecting between synchronous and asynchronous operator variants.

5. The computer implemented method of claim 4, wherein at least one of the asynchronous operator variants comprises an incremental operator that operates on both non-incremental and incremental data variants.

6. The computer implemented method as recited in claim 1, further comprising pruning input data that is older than a predefined amount.

7. The computer implemented method as recited in claim 1, wherein dynamically and periodically selecting one or more of the processing paths comprises analyzing the processing paths and their operators in an order that is top to bottom, wherein operators that have a high cost are excluded from path analysis when there is another operator that will generate the same data at a lower cost.

8. The computer implemented method as recited in claim 1, wherein dynamically and periodically selecting one or more of the processing paths is accomplished so that some abutting incremental data blocks are automatically combined.

9. The computer implemented method as recited in claim 1, wherein dynamically and periodically selecting one or more of the processing paths comprises prohibiting the combining of abutting incremental input or intermediate data that span an intermediate temporal provenance entry if either of the following conditions hold: (1) the corresponding processing path contains a non-pruned base type data type; (2) the corresponding processing path's frontier set contains Pi.

10. The computer implemented method of claim 1, wherein the incremental data variants comprise delta data blocks and the non-incremental data variants comprise base data blocks.

11. The computer implemented method of claim 1, wherein dynamically and periodically selecting one or more of the processing paths for generating the intermediate or output data comprises applying a cost model of at least one of the operators.

12. An apparatus comprising at least a processor and a memory, wherein the processor and/or memory are configured to perform operations, comprising:
   obtaining one or more temporal constraints that constrain one or more portions of the workflow;
   periodically obtaining input data and periodically generating, via one or more operators in the processing paths, intermediate or output data, wherein the input, intermediate, and output data together include both incremental and non-incremental data variants;
   dynamically and periodically selecting one or more of the processing paths for generating the intermediate or output data based on received input data or a first subset of the generated intermediate or output data and the one or more temporal constraints; and
   executing the selected one or more processing paths of the workflow so that each selected processing path generates a second subset of the intermediate or output data for the workflow.

13. The apparatus as recited in claim 12, wherein dynamically and periodically selecting one or more of the processing paths includes selecting between incremental and non-incremental data variants to achieve one or more of the constraint metrics and/or a processing cost metric.

14. The apparatus as recited in claim 12, wherein dynamically and periodically selecting one or more of the processing paths is performed after one or more portions of the workflow fail to satisfy one or more of the temporal constraints.

15. The apparatus as recited in claim 12, wherein the one or more processing paths include both synchronous and asynchronous operator variants and wherein dynamically and periodically selecting one or more of the processing paths includes selecting between synchronous and asynchronous operator variants.

16. The apparatus as recited in claim 12, wherein the at least a processor and a memory, wherein the processor and/or memory are further configured for pruning input data that is older than a predefined amount.

17. The apparatus as recited in claim 12, wherein dynamically and periodically selecting one or more of the processing paths comprises analyzing the processing paths and their operators in an order that is top to bottom, wherein operators that have a high cost are excluded from path analysis when there is another operator that will generate the same data at a lower cost.

18. The apparatus as recited in claim 12, wherein dynamically and periodically selecting one or more of the processing paths comprises prohibiting the combining of abutting incremental input or intermediate data that span an intermediate temporal provenance entry if either of the following conditions hold: (1) the corresponding processing path contains a non-pruned base type data type; (2) the corresponding processing path's frontier set contains Pi.

19. The apparatus as recited in claim 12, wherein dynamically and periodically selecting one or more of the processing paths is accomplished so that some abutting incremental data blocks are automatically combined.

20. A computer implemented method for generating an asynchronous workflow having a plurality of processing paths, comprising:
    receiving an indication of one or more operators coupled together to form a workflow, wherein the workflow contains a plurality of processing paths, each of the plurality of processing paths having one or more operators configured for processing input or intermediate data to thereby generate intermediate or output data,
    wherein the input, intermediate, and output data together include both incremental and non-incremental data variants,
    wherein the processing paths include at least one set of selectable processing paths that process incremental and non-incremental data variants, wherein such selectable processing paths are selectable by a scheduler to satisfy one or more of the constraint metrics and/or a processing cost metric; and
    obtaining one or more temporal constraints that constrain one or more portions of the workflow.

21. The computer implemented method of claim 20, wherein at one of the processing paths includes multiple paths between a pair of data channels.

22. The computer implemented method of claim 20, wherein the one or more constraint metrics include one or more input signatures that each constrains a particular operator to receive a particular data type and have a particular consistency property for data that is to be consumed by such operator.

23. The computer implemented method of claim 22, wherein the one or more input signatures indicate whether the data to be consumed by the operator is to include base type data blocks and/or delta type data blocks.

* * * * *